(12) United States Patent
Anderson et al.

(10) Patent No.: US 7,464,535 B2
(45) Date of Patent: Dec. 16, 2008

(54) ROCKET MOTOR NOZZLE THROAT AREA CONTROL SYSTEM AND METHOD

(75) Inventors: Morris G. Anderson, Mesa, AZ (US);
Jason A. Gratton, Chandler, AZ (US);
George T. Woessner, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 707 days.

(21) Appl. No.: 10/880,858

(22) Filed: Jun. 29, 2004

(65) Prior Publication Data

US 2005/0284128 A1 Dec. 29, 2005

(51) Int. Cl.
*B63H 11/00* (2006.01)

(52) U.S. Cl. ................... 60/204; 60/253; 239/265.19

(58) Field of Classification Search ............ 60/204, 60/253, 254, 200.1; 239/265.19
See application file for complete search history.

(56) References Cited

U.S. PATENT DOCUMENTS

| | | | |
|---|---|---|---|
| 3,296,799 A * | 1/1967 | Fuentes ...................... 60/231 |
| 3,626,697 A | 12/1971 | Nunn et al. |
| 3,636,711 A | 1/1972 | Paine et al. |
| 3,668,872 A * | 6/1972 | Camp et al. .................. 60/207 |
| 3,691,770 A * | 9/1972 | Nunn .......................... 60/254 |
| 3,701,256 A | 10/1972 | Pelham et al. |
| 3,844,118 A * | 10/1974 | Wilkinson ................... 60/251 |
| 3,924,406 A | 12/1975 | Caveny et al. |
| 4,023,355 A | 5/1977 | McDonald |
| 4,378,674 A | 4/1983 | Bell |
| 4,484,439 A | 11/1984 | Singer et al. |
| 4,628,688 A | 12/1986 | Keirsey |
| 4,631,916 A | 12/1986 | Le Tanter et al. |
| 4,819,426 A | 4/1989 | Singer et al. |
| 4,819,431 A | 4/1989 | Abbott |
| 4,893,470 A * | 1/1990 | Chang ......................... 60/204 |
| 5,172,547 A | 12/1992 | Lawrence et al. |
| 5,491,973 A * | 2/1996 | Knapp et al. ................. 60/242 |
| 5,808,231 A | 9/1998 | Johnston et al. |
| 6,354,074 B1* | 3/2002 | Jones et al. .................. 60/204 |
| 6,679,048 B1* | 1/2004 | Lee et al. ..................... 60/204 |
| 6,983,587 B2* | 1/2006 | Shumate ...................... 60/204 |
| 2005/0016159 A1* | 1/2005 | Buchheim ................... 60/234 |
| 2005/0258043 A1* | 11/2005 | Christensen et al. ......... 205/70 |
| 2006/0064984 A1* | 3/2006 | Gratton et al. ............... 60/770 |

* cited by examiner

*Primary Examiner*—William H Rodríguez
(74) *Attorney, Agent, or Firm*—Ingrassia, Fisher & Lorenz, P.C.

(57) ABSTRACT

A solid rocket motor including a combustion chamber, in which propellant is ignited to produce combustion gas, and a nozzle having a throat with an effective flow area, implements a system and method to inject gas into the nozzle throat to control its effective cross sectional flow area. Controlling the effective cross sectional flow area of the nozzle throat in turn controls combustion chamber pressure, thus the burn rate of the propellant in the combustion chamber, and thus the thrust generated thereby.

22 Claims, 5 Drawing Sheets

FIG. 6

ROCKET MOTOR NOZZLE THROAT AREA CONTROL SYSTEM AND METHOD

TECHNICAL FIELD

The present invention relates to solid rocket motors and, more particularly, to a system and method for controlling the effective throat area of solid rocket motor nozzles.

BACKGROUND

Many rockets and missiles include one or more solid rocket motors to generate thrust to achieve and/or maintain flight, and/or to control in-flight direction. A solid rocket motor may include, for example, a motor case and a nozzle. Typically, the motor case defines a combustion chamber, in which propellant is loaded and combusted to generate high-energy combustion gas. The nozzle is typically in fluid communication with the combustion chamber and thus receives the high-energy combustion gas. The nozzle may include a convergent inlet section, a divergent outlet section, and an interposing nozzle throat. Combustion gas generated in the combustion chamber flows through the nozzle, generating a thrust.

Solid rocket motors, such as the one briefly described above, are used in both strategic and tactical rockets and missiles. In general, strategic missiles are used for long duration missions, whereas tactical missiles are used for relatively short duration flight missions. Thus, many tactical missiles use solid rocket motors with relatively high burn rates. If the burn rate of the solid rocket motor can be controlled, the thrust generated by the motor can also be controlled, and the overall operation of the rocket can become more efficient.

As is generally known, the burn rate of the propellant in a solid rocket motor may vary with the pressure in the combustion chamber. For example, if the combustion chamber pressure increases, the propellant burn rate increases, and the thrust generated by the rocket motor will concomitantly increase. Conversely, if the combustion chamber pressure decreases, the propellant burn rate decreases, and the thrust generated by the rocket motor decreases. One way of controlling combustion chamber pressure, and thus propellant burn rate, is by controlling the effective flow area of the nozzle throat. For example, if the effective flow area of the nozzle throat decreases, combustion chamber pressure increases, and vice-versa.

Various systems and methods have been developed for varying the effective flow area of a rocket nozzle throat. Such systems and methods include selectively venting combustion gas from the combustion chamber, controlling overall exhaust flow, and selectively physically altering the flow area nozzle throat. Although these systems and methods are effective, each suffers certain drawbacks. For example, the present systems and methods can significantly affect overall rocket motor efficiency, and may rely on fairly complex and costly components and control systems.

Hence, there is a need for a system and method of controlling rocket motor nozzle effective flow area that does not significantly affect overall motor efficiency and/or does not rely on fairly complex and costly components and control systems. The present invention addresses one or more of these needs.

BRIEF SUMMARY

The present invention provides a system and method of controlling rocket motor nozzle effective flow area that does not significantly affect overall motor efficiency and/or is less expensive than presently known systems and methods.

In one embodiment, and by way of example only, a rocket motor includes a motor, a nozzle, an injection duct, and a control valve. The motor has an inner surface defining a combustion chamber. The combustion chamber is configured to receive a propellant therein and to supply combustion gas upon ignition of the propellant. The nozzle includes an inlet section, a nozzle throat, and an outlet section fluidly coupled in flow-series. The nozzle inlet section is in fluid communication with the combustion chamber and includes an inner surface defining a nozzle inlet passage having a convergent cross sectional flow area. The nozzle outlet section includes an inner surface defining a nozzle outlet flow passage having a divergent cross sectional flow area. The injection duct has an inlet port, an outlet port, and an injection flow passage there between. The inlet port is adapted to receive a flow of fluid, and the outlet port is in fluid communication with the nozzle throat. The control valve is mounted on the injection duct and is moveable between at least a closed position, in which the injection duct inlet port is fluidly isolated from the injection duct outlet port, and an open position, in which the injection duct inlet port is fluidly coupled to the injection duct outlet port, whereby fluid supplied to the injection duct inlet port is injected into the nozzle throat.

In another exemplary embodiment, a solid rocket motor includes a motor, a nozzle, an injection duct, and a control valve. The motor has an inner surface defining a combustion chamber. The combustion chamber is configured to receive a propellant therein and to supply combustion gas upon ignition of the propellant. The nozzle includes a primary throat, a secondary throat, and an outlet section fluidly coupled in flow-series. The primary throat is in fluid communication with the combustion chamber and has a first cross sectional flow area, and the secondary throat has a second cross sectional area that is larger than the first cross sectional area. The injection duct has an inlet port, an outlet port, and a bypass flow passage there between. The duct inlet port is in fluid communication with the combustion chamber, and the duct outlet port in fluid communication with the secondary throat. The control valve is mounted on the injection duct and is moveable between at least a closed position, in which the injection duct inlet port is fluidly isolated from the injection duct outlet port, and an open position, in which the injection duct inlet port is fluidly coupled to the injection duct outlet port, whereby fluid supplied to the injection duct inlet port is injected into the secondary throat.

In yet another exemplary embodiment, a method of controlling the effective flow area of a nozzle throat in a solid rocket motor that includes a nozzle having a convergent inlet port coupled to receive combustion gas from a combustion chamber, a divergent outlet port, and an interposing nozzle throat includes supplying a flow of combustion gas from the combustion chamber to the convergent inlet port, whereby the combustion gas flows through the convergent inlet port, the nozzle throat, and the convergent outlet port to thereby generate thrust. A flow of a control gas is selectively injected into the nozzle throat downstream of the convergent inlet port, whereby the effective nozzle throat flow area is selectively varied.

Other independent features and advantages of the preferred nozzle throat flow area system and method will become apparent from the following detailed description, taken in conjunction with the accompanying drawings which illustrate, by way of example, the principles of the invention.

DETAILED DESCRIPTION OF PREFERRED EMBODIMENTS

The following detailed description is merely exemplary in nature and is not intended to limit the invention or its application and uses. Furthermore, there is no intention to be bound by any theory presented in the preceding background or the following detailed description. In this regard, before proceeding with the detailed description, it will be appreciated that the present invention is not limited to use with a particular type or configuration of rocket motor. Thus, although the embodiments are described as being implemented in a rocket motor that includes a blast tube, it will be appreciated that the embodiments could also be implemented in rocket motor that does not include a blast tube.

Figure 1:
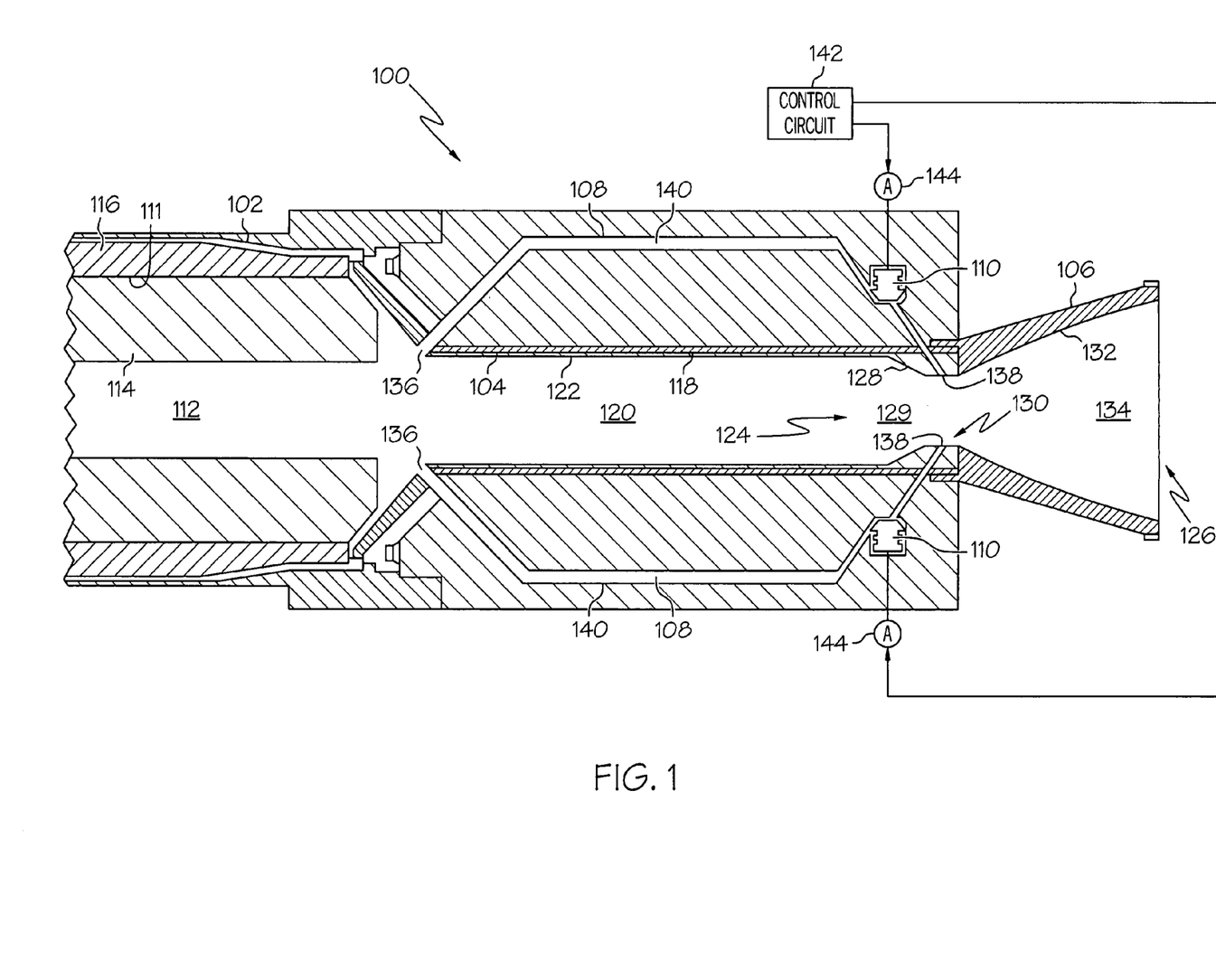
FIG. 1 is a simplified cross section view of an exemplary solid rocket motor that may be used to implement the present invention.

A simplified cross section view of an exemplary embodiment of a solid rocket motor 100 is shown in FIG. 1. The solid rocket motor 100 includes a motor case 102, a blast tube 104, a nozzle 106, a plurality of injection ducts 108, and a plurality of control valves 110. The motor case 102 has an inner surface 111 that defines a combustion chamber 112 in which a rocket propellant 114 is housed. In the depicted embodiment, an insulation layer 116 is deposited on the motor case inner surface 111. As is generally known, the insulation layer 116 protects the case 102 from the potentially extreme conditions produced by combustion of the propellant 114. It will be appreciated that in some embodiments, the motor case 102 may additionally include a non-illustrated liner deposited on the insulation layer 116. The liner, if included, bonds the rocket propellant 114 to the insulation layer 116 and the case 102, and creates a seal to prevent hot combustion gases from penetrating through the insulation layer 116 to the motor case 102.

In the depicted embodiment, the rocket propellant 114 is a solid rocket propellant, though it will be appreciated that various other types of propellant may be used. The manner in which the rocket propellant 114 is formed and subsequently loaded into the rocket motor case 102 are generally well known, and will thus not be further discussed. No matter the particular type of rocket propellant 114, nor the particular manner in which the rocket propellant 114 is formed and loaded, it will be appreciated that a non-illustrated igniter, upon receipt of one or more command signals, ignites the rocket propellant 114. The ignited rocket propellant 114 produces combustion gas, which is directed into the blast tube 104.

The blast tube 104 is coupled to the motor case 102 and includes an inner surface 118 that defines a flow passage 120. In the depicted embodiment, an insulation layer 122 is also deposited on the blast tube inner surface 118, which protects the blast tube 104 from the combustion gas. As is shown in FIG. 1, the blast tube flow passage 120 is in fluid communication with the combustion chamber 112 and thus, as was alluded to above, receives the combustion gas produced in the combustion chamber 112, and directs the combustion gas into the nozzle 106.

The nozzle 106 is coupled to the blast tube 104 and includes an inlet section 124 and an outlet section 126, interposed by a nozzle throat 130, and that together define a convergent/divergent flow passage. In particular, the nozzle inlet section 124 includes an inner surface 128 that defines an inlet flow passage 129 having a convergent cross sectional flow area, and the nozzle outlet section 126 includes an inner surface 132 that defines an outlet flow passage 134 having a divergent cross sectional flow area and which is fluidly coupled to the inlet flow passage via the nozzle throat 130. During operation of the rocket motor 100, the combustion gas produced in the motor case 102 flows through the blast tube 104, into and through the inlet flow passage 129, and into and through the nozzle throat 130. The velocity of the combustion gas increases as it passes through the nozzle throat 130, and generates thrust upon being expelled from the outlet flow passage 134.

Turning now to the remainder of the rocket motor 100, it is seen that the injection ducts 108 extend through the motor case 102 and each includes an inlet port 136, an outlet port 138, and an injection flow passage 140 disposed there between. In the depicted embodiment, the rocket motor 100 includes two injection ducts 108; however, it will be appreciated that this is merely exemplary and that various other numbers of injection ducts 108 may be included. No matter the particular number of injection ducts 108 that are included, each injection duct inlet port 136, at least in the depicted embodiment, is in fluid communication with the combustion chamber 112, and each injection duct outlet port 138 is in fluid communication with the nozzle throat 130. It will be appreciated that alternative embodiments, the injection duct inlet ports 136 could be in fluid communication with a non-illustrated, external source of pressurized gas flow.

A control valve 110 is mounted on each of the injection ducts 108 and is disposed at least partially within the injection flow passage 140. The control valves 110 are each movable between a closed position (shown in FIG. 1) and an open position (not shown). When the control valves 110 are in the closed position, the injection duct fluid inlet ports 136 are fluidly isolated from the associated injection duct fluid outlet ports 138, and flow through the associated flow passage 140 is prevented. Conversely, when the control valves are in the open position, the injection duct fluid inlet ports 136 are fluidly coupled to the associated injection duct fluid outlet ports 138, and flow through the associated flow passage 140 is allowed. In the depicted embodiment, the control valves 110 are implemented using poppet valves. It will be appreciated, however, that the control valves 110 may be implemented using any one of numerous types of valves now known, or developed in the future. In addition, although the depicted embodiment includes one control valve 110 on each injection duct 108, it will be appreciated that the rocket motor 100 could be configured such that a single control valve 110 controls the flow through a plurality of injection ducts 108.

The position of the control valves 110 is controlled, as shown in FIG. 1, via commands received from a control circuit 142. The control circuit 142 may be, for example, a central flight computer, or it may receive one or more signals from a central flight computer or other source. In any case, the control circuit 142 issues appropriate commands to the control valves 110 to effectuate movement thereof to the open or closed positions. In FIG. 1, the command signals are, for clarity and ease of illustration, shown as being supplied directly to the control valves 110, which include appropriate actuators 144 to respond to the command signals. It will be appreciated, however, that the command signals could be supplied to one or more actuation devices remote from the control valves 110 that, in response to the command signals, cause the control valves 110 to move to the commanded position. No matter the particular control valve 110 and actuator 144 configurations and implementations, it will be appreciated that the control circuit 142 could be configured to issue the command signals to the valve actuators 144 at no set periodicity, or to issue the command signals at a desired periodicity. In the latter instance, the control valves 110 would open and close at the desired periodicity, thereby allowing flow through the associated flow passages 140 at the set periodicity.

As was previously noted, the burn rate of a solid propellant can be controlled by controlling the pressure in the combustion chamber 112. As was also previously noted, one method of controlling combustion chamber pressure is to control the effective throat area of the nozzle throat 130. In the depicted embodiment, this is accomplished by selectively injecting gas either into, or downstream of, the nozzle throat 130. More specifically, combustion gas from the combustion chamber 112 is selectively injected into, or downstream of, the nozzle throat 130, via the injection ducts 108, by selectively opening and closing the control valves 110. In one embodiment, the effective nozzle throat area is controlled by selectively bypassing a portion of the combustion gas downstream of either a portion of the nozzle throat 130 or downstream of the entire nozzle throat 130. In another embodiment, the effective nozzle throat area is controlled by selectively injecting a portion of the combustion gas into the nozzle throat 130, to thereby create a vena contracta. The former embodiment, in which a portion of the combustion gas is bypassed downstream of either a portion of the nozzle throat 130 or the entire nozzle, will first be described. Thereafter, the vena contracta embodiment will be described.

Figure 2:
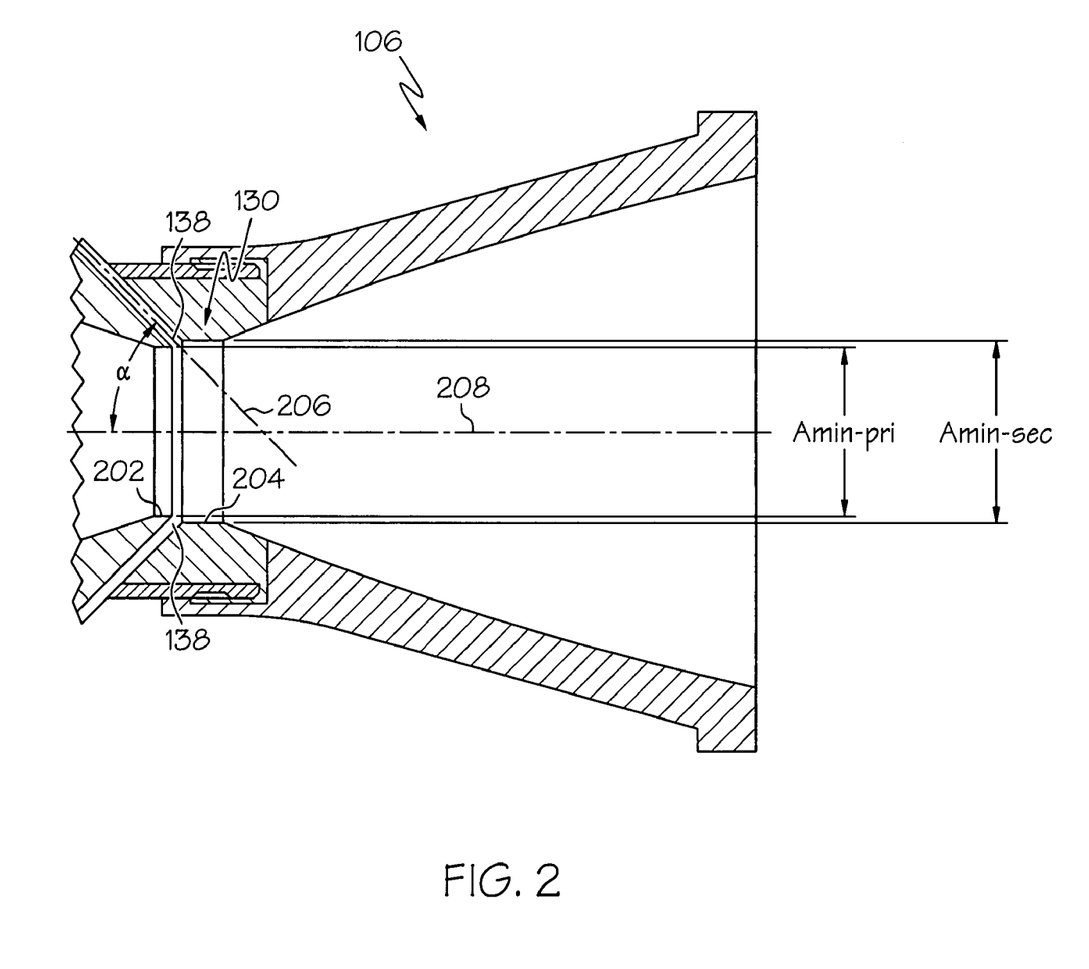
FIG. 2 is a cross section view of an exemplary nozzle according to an embodiment of the present invention that may be used with the rocket of FIG. 1.

Turning now to FIG. 2, a close up view of one particular preferred embodiment of the nozzle 106 that is used when the bypass flow method is implemented is shown. As shown therein, the nozzle throat 130 includes two throats—a primary throat 202 and a secondary throat 204, each having a minimum cross sectional flow area. In the depicted embodiment, the primary throat 202, which is disposed upstream of the secondary throat 204, has a minimum cross sectional flow area ($A_{min-pri}$) that is less than the minimum cross sectional flow area ($A_{min-sec}$) of the secondary throat 204.

As FIG. 2 also shows, the injection duct outlet ports 138 are in fluid communication with the secondary throat 204, and are thus disposed downstream of the primary throat 202. During operation of the solid rocket motor 100, when the control valves 110 are closed, all of the combustion gas flows through the primary throat 202. Conversely, when the control valves 110 are open, a portion of the combustion gas produced in the combustion chamber 112 is bypassed around the primary throat 202, and is injected into the secondary throat 204, where it rejoins the remainder of the combustion gas downstream of the primary throat 202. Although the nozzle throat 130 in the embodiment shown in FIG. 2 includes two throats 202, 204, it will be appreciated that the nozzle throat 130 could include more than this number of throats.

No matter the particular number of throats included in the nozzle throat 130, when the injected bypass gas rejoins the remainder of the combustion gas, a new "effective throat" having an "effective cross sectional flow area" is created. The "effective cross sectional flow area" of the "effective throat" is larger than the cross sectional flow area of the nozzle throat 130 when the control valves 110 are closed. As will be appreciated, the larger effective cross sectional flow area results in a lower pressure in the combustion chamber 112, which in turn lowers the burn rate of the propellant 114.

Figure 5:
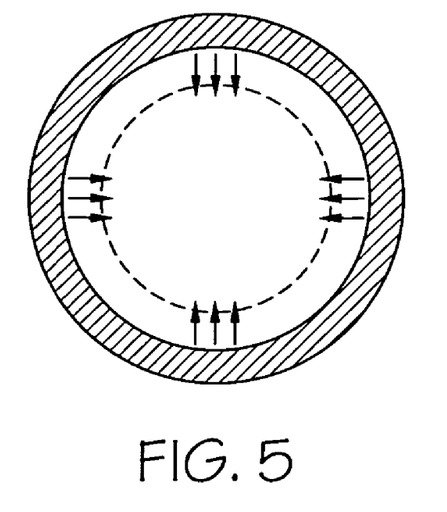
FIGS. 5 and 6 are cross section views of a nozzle throat showing various ways in which gas may be injected into the nozzles of FIGS. 2, 3, and 4.
Figure 6:
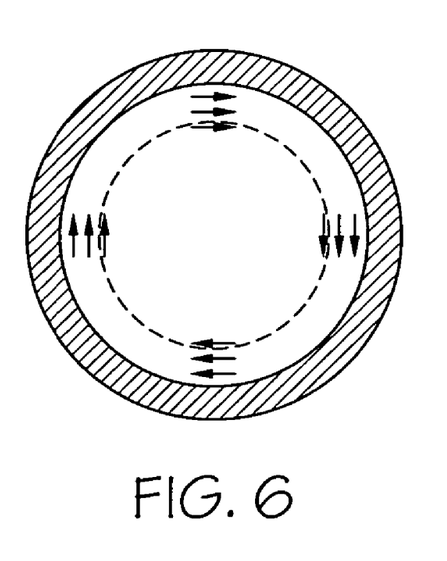

In the embodiment depicted in FIG. 2, the bypass gas is injected at an angle relative to the direction of main combustion gas flow through the primary throat 202. More specifically, and with continued reference to FIG. 2, it is seen that the injection duct outlet ports 138 and the nozzle 106 each have a central axis 206 and 208, respectively. Thus, the injection duct outlet ports 138 are configured such that the central axis 206 of each is disposed at a predetermined angle ($\alpha$) relative to the central axis 208 of the nozzle 106. It will be appreciated that this configuration is merely exemplary of a particular preferred embodiment, and that the injection duct outlet ports 138 could have central axes 206 disposed substantially perpendicular to the nozzle central axis 208. It will additionally be appreciated that the injection duct outlet ports could be configured such that the bypass gas is injected into the main combustion gas flow either radially, as shown in FIG. 5, or tangentially, as shown in FIG. 6.

Figure 3:
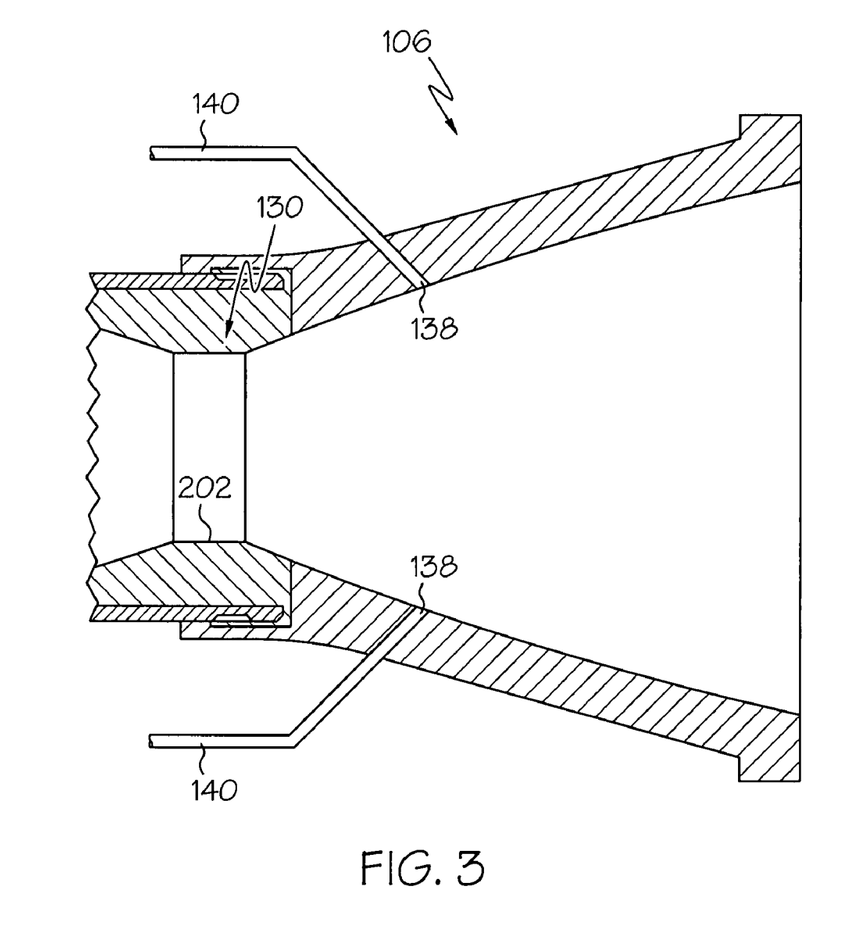
FIG. 3 is a cross section view of the exemplary nozzle shown in FIG. 2 according to an alternative embodiment of the present invention that may be used with the rocket of FIG. 1.

In the embodiment depicted in FIGS. 1 and 2 and described above, the bypass gas is injected immediately downstream of the primary throat 202, via the secondary throat 204. It will be appreciated, however, that this is merely exemplary of a particular preferred embodiment, and that the bypass gas could instead by injected into any one of numerous regions downstream of the primary throat 202. For example, as shown in FIG. 3, the bypass gas could be injected into the nozzle outlet flow passage 134. In the embodiment depicted in FIG. 3, the nozzle throat 130 is configured to include only the primary 202, and not the secondary 204 throat. It will nonetheless be appreciated that the nozzle throat 130 could be configured to include two or more throats, as in the embodiment shown in FIG. 2.

Figure 4:
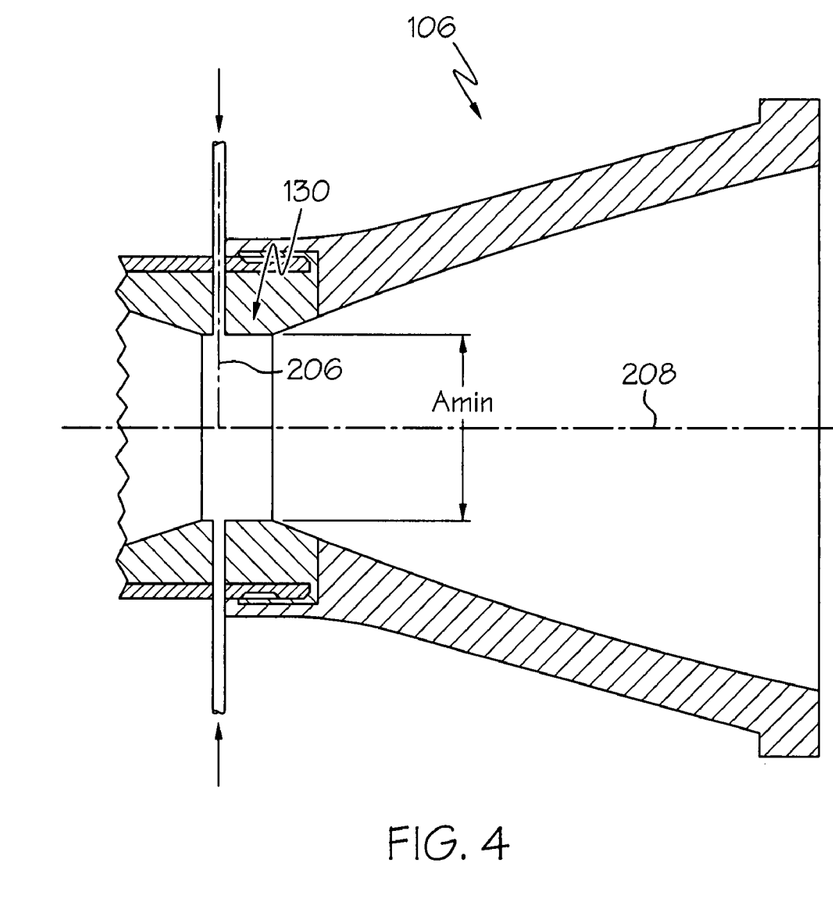
FIG. 4 is a cross section view of an exemplary nozzle according to yet another alternative embodiment of the present invention that may be used with the rocket of FIG. 1.

Turning now to the vena contracta method of controlling nozzle effective throat area, and with reference to FIG. 4, a preferred embodiment of a nozzle 106 used with this method is shown. In the nozzle 106 shown in FIG. 4, the nozzle throat 130 does not include the primary 202 and secondary 204 throats, and has only a single minimum cross sectional flow area ($A_{min}$). As FIG. 4 also shows, the injection duct outlet ports 138 are preferably configured such that the outlet port central axes 206 are substantially perpendicular to the nozzle central axis 208. It will be appreciated, however, that this is merely exemplary, and that the injection duct outlet port central axes 206 could be disposed at a non-perpendicular angle ($\alpha$) relative to the nozzle central axis 208. As with the bypass method, it will additionally be appreciated that the injection ducts 108 could be configured to inject combustion gas into the nozzle throat 130 either radially (FIG. 5) or tangentially (FIG. 6).

During operation of a solid rocket motor 100 configured to implement the vena contracta method, the control circuit 142 issues appropriate commands that cause the control valves 110 to open and close at a set periodicity. When the control valves 110 are closed, no combustion gas flows through the injection ducts 108. Conversely, when the control valves 110 are open, a portion of the combustion gas produced in the combustion chamber 112 flows through the injection ducts 108 and is injected into the nozzle throat 130. The periodically injected combustion gas creates a vena contracta (shown in phantom in FIGS. 5 and 6), which reduces the effective cross sectional flow area of the nozzle throat 130. A reduced effective cross sectional flow area will increase pressure in the combustion chamber 112, which will in turn increase the burn rate of the propellant 114.

The rocket motor 100 described herein is merely exemplary of a particular configuration and could be implemented in any one of numerous physical configurations. For example, as was previously noted, the rocket motor 100 could be implemented without the blast tube 104. Instead, the nozzle 106 could be coupled directly to the motor case 102. No matter the particular rocket motor configuration used, each utilizes the injection of gas into the nozzle throat to control its effective cross sectional flow area. This in turn controls combustion chamber pressure and, thus, propellant burn rate.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A rocket motor, comprising:
   a motor having an inner surface defining a combustion chamber, the combustion chamber configured to receive a propellant therein and supply combustion gas upon ignition of the propellant;
   a nozzle including at least an inlet section, a primary throat, and an outlet section fluidly coupled in flow-series, the nozzle inlet section in fluid communication with the combustion chamber and including an inner surface defining a nozzle inlet passage having a convergent cross sectional flow area, the nozzle outlet section including an inner surface defining a nozzle outlet flow passage having a divergent cross sectional flow area;
   an injection duct having an inlet port, an outlet port, and an injection flow passage there between, the inlet port adapted to receive a flow of fluid, the outlet port disposed downstream of, and in fluid communication with, the primary nozzle throat; and
   a control valve mounted on the injection duct and moveable between at least (i) a closed position, in which the injection duct inlet port is fluidly isolated from the injection duct outlet port, and (ii) an open position, in which the injection duct inlet port is fluidly coupled to the injection duct outlet port, whereby fluid supplied to the injection duct inlet port is injected downstream of the primary nozzle throat,
   wherein the fluid is injected one of either (i) radially into the throat or (ii) into the nozzle throat tangential to combustion gas flow through the nozzle throat.

2. The motor of claim 1, further comprising:
   a secondary nozzle throat fluidly coupled in flow-series between the primary nozzle throat and the nozzle outlet section,
   wherein the primary nozzle throat has a minimum cross sectional flow area, and the secondary nozzle throat has a minimum cross sectional flow area that is greater than the primary nozzle throat minimum cross sectional flow area.

3. The motor of claim 2, wherein the injection duct outlet port is in fluid communication with the secondary nozzle throat.

4. The motor of claim 1, wherein:
   the injection duct outlet port and the nozzle inlet flow passage each have a central axis; and
   the injection duct outlet port central axis is disposed at a predetermined injection angle relative to the nozzle inlet flow passage central axis, whereby fluid supplied to the injection duct inlet port is injected into the nozzle inlet flow passage at the predetermined injection angle.

5. The motor of claim 4, wherein the predetermined injection angle is less than 90-degrees.

6. The motor of claim 1, further comprising:
   a controller configured to supply one or more valve commands; and
   a valve actuator coupled to receive the valve commands and operable, in response thereto, to move the control valve between the open and closed positions.

7. The motor of claim 6, wherein the controller is configured to supply the valve commands at a set periodicity, whereby the control valve is periodically moved between the open and closed position at the set periodicity.

8. The motor of claim 1, wherein the inlet port is in fluid communication with the combustion chamber.

9. The motor of claim 1, wherein the control valve is a poppet valve.

10. A solid rocket motor, comprising:
    a motor having an inner surface defining a combustion chamber, the combustion chamber configured to receive a propellant therein and supply combustion gas upon ignition of the propellant;
    a nozzle including a primary throat, a secondary throat, and an outlet section fluidly coupled in flow-series, the primary throat in fluid communication with the combustion chamber and having a first cross sectional flow area, the secondary throat having a second cross sectional area that is larger than the first cross sectional area;
    an injection duct having an inlet port, an outlet port, and a bypass flow passage there between, the injection duct inlet port in fluid communication with the combustion chamber, the injection duct outlet port in fluid communication with the secondary throat; and
    a control valve mounted on the injection duct and moveable between at least (i) a closed position, in which the injection duct inlet port is fluidly isolated from the injection duct outlet port, and (ii) an open position, in which the injection duct inlet port is fluidly coupled to the injection duct outlet port, whereby a portion of the combustion gas bypasses the nozzle primary throat and is injected into the nozzle secondary throat.

11. The motor of claim 10, wherein:
    the injection duct outlet port and the nozzle inlet flow passage each have a central axis; and
    the injection duct outlet port central axis is disposed at a predetermined injection angle relative to the nozzle inlet flow passage central axis, whereby fluid supplied to the injection duct inlet port is injected into the nozzle inlet flow passage at the predetermined injection angle.

12. The motor of claim 11, wherein the predetermined injection angle is less than 90-degrees.

13. The motor of claim 10, further comprising:
    a controller configured to supply one or more valve commands; and
    a valve actuator coupled to receive the valve commands and operable, in response thereto, to move the control valve between the open and closed positions.

14. The motor of claim 13, wherein the controller is configured to supply the valve commands at a set periodicity, whereby the control valve is periodically moved between the open and closed position at the set periodicity.

15. The motor of claim 10, wherein the fluid is injected radially into the throat.

16. The motor of claim 10, wherein the fluid is injected into the nozzle throat tangential to combustion gas flow through the nozzle throat.

17. The motor of claim 10, wherein the inlet port is in fluid communication with the combustion chamber.

18. The motor of claim 10, wherein the control valve is a poppet valve.

19. A rocket motor, comprising:
   a motor having an inner surface defining a combustion chamber, the combustion chamber configured to receive a propellant therein and supply combustion gas upon ignition of the propellant;
   a nozzle including at least an inlet section, a nozzle throat, and an outlet section fluidly coupled in flow-series, the nozzle inlet section in fluid communication with the combustion chamber and including an inner surface defining a nozzle inlet passage having a convergent cross sectional flow area, the nozzle outlet section including an inner surface defining a nozzle outlet flow passage having a divergent cross sectional flow area;
   an injection duct having an inlet port, an outlet port, and an injection flow passage there between, the inlet port adapted to receive a flow of fluid, the outlet port in fluid communication with nozzle throat;
   a control valve mounted on the injection duct and moveable between at least (i) a closed position, in which the injection duct inlet port is fluidly isolated from the injection duct outlet port, and (ii) an open position, in which the injection duct inlet port is fluidly coupled to the injection duct outlet port, whereby fluid supplied to the injection duct inlet port is injected downstream of the primary nozzle throat;
   a controller configured to supply one or more valve commands at a set periodicity; and
   a valve actuator coupled to receive the valve commands and operable, in response thereto, to periodically move the control valve between the open and closed positions at the set periodicity.

20. In a solid rocket motor including at least a nozzle having a convergent inlet port coupled to receive combustion gas from a combustion chamber, a divergent outlet port, a primary nozzle throat having a first cross sectional flow area fluidly coupled between the inlet and outlet ports, and a secondary nozzle throat having a second cross sectional flow area fluidly coupled between the primary nozzle throat and the outlet port, a method of controlling the first cross sectional flow area of the primary nozzle throat, the method comprising the steps of:
   supplying a flow of combustion gas from the combustion chamber to the convergent inlet port, whereby the combustion gas flows through the convergent inlet port, the primary nozzle throat, and the convergent outlet port to thereby generate thrust; and
   selectively injecting a flow of a control gas into the nozzle secondary throat, whereby the effective nozzle throat first cross sectional flow area is selectively varied.

21. The method of claim 20, further comprising:
   selectively injecting the flow of control at a predetermined periodicity.

22. In a solid rocket motor including at least a nozzle having a convergent inlet port coupled to receive combustion gas from a combustion chamber, a divergent outlet port, and an interposing nozzle throat having an effective flow area, a method of controlling the effective flow area of the nozzle throat, the method comprising the steps of:
   supplying a flow of combustion gas from the combustion chamber to the convergent inlet port, whereby the combustion gas flows through the convergent inlet port, the nozzle throat, and the convergent outlet port to thereby generate thrust; and
   injecting a flow of a control gas downstream of the nozzle throat at a predetermined periodicity, whereby the effective nozzle throat flow area is varied.

* * * * *

UNITED STATES PATENT AND TRADEMARK OFFICE
CERTIFICATE OF CORRECTION

PATENT NO. : 7,464,535 B2 Page 1 of 1
APPLICATION NO. : 10/880858
DATED : December 16, 2008
INVENTOR(S) : Morris G. Anderson et al.

It is certified that error appears in the above-identified patent and that said Letters Patent is hereby corrected as shown below:

Column 10, line 21, "effective nozzle throat" should be deleted.

Signed and Sealed this

Twelfth Day of May, 2009

JOHN DOLL
*Acting Director of the United States Patent and Trademark Office*